(12) United States Patent
Slavin

(10) Patent No.: US 11,336,450 B2
(45) Date of Patent: May 17, 2022

(54) SYSTEM AND METHOD FOR IMPLEMENTING MARKET DATA RIGHTS ENFORCEMENT

(71) Applicant: JPMorgan Chase Bank, N.A., New York, NY (US)

(72) Inventor: Ilya Slavin, Allen, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 399 days.

(21) Appl. No.: 16/563,106

(22) Filed: Sep. 6, 2019

(65) Prior Publication Data

US 2021/0075612 A1    Mar. 11, 2021

(51) Int. Cl.
| | | |
|---|---|---|
| G06Q 30/02 | (2012.01) | |
| H04L 9/32 | (2006.01) | |
| G06N 20/00 | (2019.01) | |

(52) U.S. Cl.
CPC ........... *H04L 9/3213* (2013.01); *G06N 20/00* (2019.01); *G06Q 30/0201* (2013.01); *H04L 9/3247* (2013.01)

(58) Field of Classification Search
CPC .. G06N 20/00; G06Q 30/0201; H04L 9/3213; H04L 9/3247
See application file for complete search history.

(56) References Cited

U.S. PATENT DOCUMENTS

| | | | | |
|---|---|---|---|---|
| 8,397,066 | B2* | 3/2013 | Krishnamoorthy | ..... G06F 21/31 |
| | | | | 713/165 |
| 2013/0318619 | A1 | 11/2013 | Heyner | |
| 2014/0181003 | A1 | 6/2014 | Kling et al. | |
| 2015/0193604 | A1 | 7/2015 | Li et al. | |
| 2017/0232300 | A1 | 8/2017 | Tran | |
| 2017/0293899 | A1 | 10/2017 | Furche et al. | |
| 2017/0331829 | A1* | 11/2017 | Lander | .................. H04L 67/28 |
| 2019/0156304 | A1 | 5/2019 | Hudson et al. | |
| 2020/0334752 | A1* | 10/2020 | Doney | .................. H04L 9/3239 |

OTHER PUBLICATIONS

Notification of Transmittal of the International Search Report and The Written Opinion of the International Searching Authority dated Nov. 19, 2020 in PCT/US2020/048378.

* cited by examiner

*Primary Examiner* — Olugbenga O Idowu
(74) *Attorney, Agent, or Firm* — Greenblum & Bernstein, P.L.C.

(57) ABSTRACT

An embodiment of the present invention is directed to delivering an entitlements model that scales to both mid-frequency and low-latency use cases. The innovative solution may be distributed in nature and able to operate in low priority threads alongside the main logic of the software. An embodiment of the present invention may be implemented as a software module with APIs for ease of adoption.

20 Claims, 2 Drawing Sheets

SYSTEM AND METHOD FOR IMPLEMENTING MARKET DATA RIGHTS ENFORCEMENT

FIELD OF THE INVENTION

The invention relates generally to a system and method for implementing a market data rights enforcement design to simplify compliance and increase transparency.

BACKGROUND OF THE INVENTION

Market Data Entitlements Enforcement has long been controlled by conventional technologies that operate "in-line." This means that one has to ask permission every time a new market data subscription is created and wait for the answer, which includes a check of the number of concurrent instances of the same entitlement identifier. However, this approach is not suitable for low latency applications, which rely on declaration of usage instead of entitlement checks. Additionally, existing solutions have not succeeded to evolve with the way computing is done today with emergence of Elastic and Cloud compute as well as non-streaming applications, generating islands of compliance risk that are poorly understood or explicitly ignored.

Integration points for these solutions have been technically challenging, resulting in postponement of development effort, in many case for years. This means that numerous applications are not properly implementing entitlements in their code. Some content owners are changing the reporting requirements of their licensees. These clauses have evolved to a point where firms are unable to report in the way these exchanges require, introducing additional legal and audit risk. They have also stopped allowing declaration of usage, creating extra risk for low latency applications, which presently have no other realistic way of reporting their usage. Existing solutions do not allow for delegation of entitlements by one client system to another, which is important for tracing data lineage within the firm.

These and other drawbacks exist.

SUMMARY OF THE INVENTION

According to one embodiment, the invention relates to a system that implements a market data rights enforcement architecture to simplify compliance and increase transparency. The system comprises: a memory component configured to generate, store and manage one or more tokens and one or more associated Access Tickets; and a computer processor, coupled to the memory component, that executes a client application, the computer processor configured to perform the steps of: identifying, via the client application, a token, wherein the token is a cryptographically signed description of entitlements, rights and obligations a requesting user has for one or more data sources, the token comprises a count of positions, a predetermined expiration and reference data; generating a set of Access Tickets based on the token, wherein each Access Ticket is associated with a position, wherein the position represents a single instance of a process that accesses market data; and using an Access Ticket to retrieve associated market data pursuant to a corresponding set of rights and obligations.

According to another embodiment, the invention relates to a method that implements a market data rights enforcement architecture to simplify compliance and increase transparency. The method comprises the steps of: identifying, via a client application, a token, wherein the token is a cryptographically signed description of entitlements, rights and obligations a requesting user has for one or more data sources, the token comprises a count of positions, a predetermined expiration and reference data; generating a set of Access Tickets based on the token, wherein each Access Ticket is associated with a position, wherein the position represents a single instance of a process that accesses market data; and using an Access Ticket to retrieve associated market data pursuant to a corresponding set of rights and obligations.

The system may include a specially programmed computer system comprising one or more computer processors, interactive interfaces, electronic storage devices, and networks. The computer implemented system and method described herein provide unique advantages to entities, organizations and other users, according to various embodiments of the invention. Market data consumers report market data activity to various market data vendors. Requirements associated with reporting are getting more and more complicated and restrictive while current system architectures are unable to support such requirements. For example, current agreements require aligning end users to specific applications they use to consume market data. An embodiment of the present invention is directed to applying entitlements from a perspective of obligations to information owners and data brokers. In addition, an embodiment of the present invention is directed to ensuring that users are given proper and authorized access to market data. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
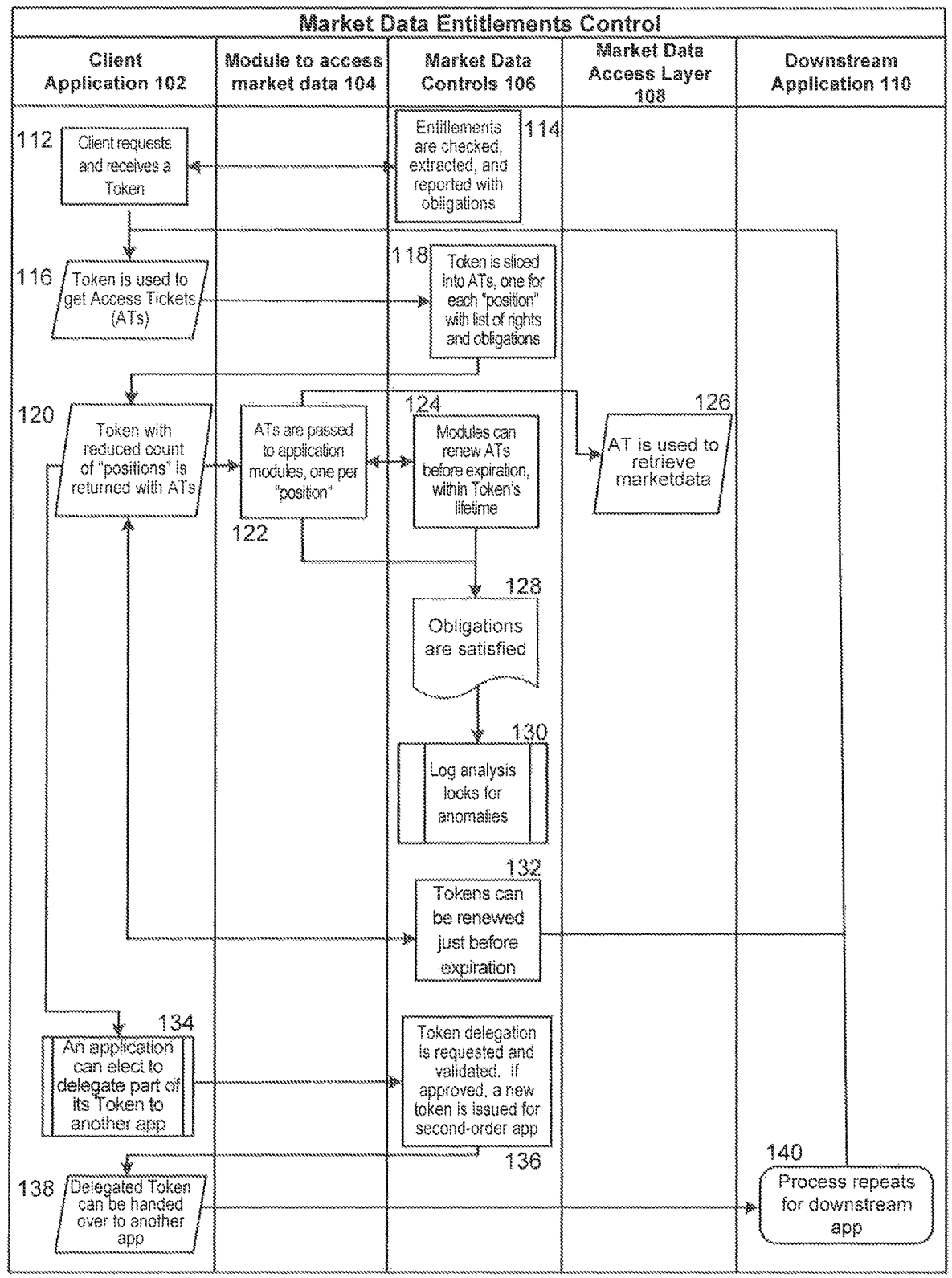
FIG. 1 illustrates an exemplary flow chart of a market data entitlements control, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Generally, exchanges do not mandate restrictions on simultaneous access to their content, with the understanding that a licensee will permit access in a way that prevents uncontrolled distribution of licensed content within their firm or sharing of data between users. An embodiment of the present invention is directed to a distributed model that relies on data analytics and machine learning to detect misuse and raise alerts. This moves controls away from traditional in-line blocks.

An embodiment of the present invention is directed to delivering an entitlements model that scales to both mid-frequency and low-latency use cases. The innovative solution may be distributed in nature and able to operate in low priority threads alongside the main logic of the software. An embodiment of the present invention may be implemented as a software module with APIs for ease of adoption. Exemplary implementations may include Java and a C++.

With an embodiment of the present invention, the number of times an original source of entitlements is accessed may be minimized, as it is an expensive operation and content changes infrequently.

An embodiment of the present invention has a strong reliance on reporting where operations of the innovative system may provide telemetry via a high-throughput message bus. According to an exemplary implementation, its write speed may be scaled with market data consumption by an organization or firm. For example, data written onto the message bus may be off-loaded into a data store to be used in reporting and analysis. An embodiment of the present invention may provide a high speed interconnect between the message bus of choice and the database that does not create back-pressure on the original sender of messages.

In order for the client software nodes of the enforcement system to be aware of the applicable entitlements, a relevant snapshot may be passed to the client. While various options exist, an embodiment of the present invention may rely on W3C's ODRL as a standard. Open Digital Rights Language (ODRL) represents an emerging industry standard supported by the World Wide Web Consortium (W3C), and is a machine-readable format for describing rights assessments. An extension of the standard, ODRL Profile, is being designed to address the specific needs of Market Data contracts.

An embodiment of the present invention is directed to a Distributed Communication Model and implements an entitlement solution that does not need to validate identities or encrypt communications between components.

An embodiment of the present invention may implement two types of cryptographically signed objects, namely a Token and an Access Ticket (AT).

A Token may be granted by a Market Data Control infrastructure. It encodes key compliance details, such as rights and duties pertinent to a client's operation, number of concurrent connections the client is permitted and the overall expiration times, etc. According to an exemplary embodiment, creation of the Token may be the only time when the entitlements store is accessed. A Token may represent a cryptographically signed description of entitlements, rights and obligations the requesting user has for data sources they asked to be included. A Token may have a pre-defined lifetime, during which time it may be used to generate a maximum number of "Access Tickets." Each time an Access Ticket is generated, the Token may be "reduced" in the count of Positions still available. A Token may be validated by a creator (e.g., market data controls infrastructure) and may not be changed once it is issued except by creating another Token.

An Access Ticket (AT) may be generated on an as-needed bases by the Market Data Control infrastructure. The Access Ticket may be generated using a valid Token, or through a process of renewing an expiring AT. A very light-weight object containing a subset of its parent Token's data, ATs may be used to gain access to market data sources. By design, one AT may be associated with a single instance of a running process belonging to the application that wishes to access market data. For example, in the case of a display user, it would be their desktop terminal.

An Access Ticket may represent a cryptographically signed short-lived document that permits specific usage rights and defines obligation for a single "Position." Once a module receives an Access Ticket, it may access market data it is entitled to from the Market Data Control infrastructure using AT and follow obligations defined. An Access Ticket may be passed to other modules when it is no longer needed until it expires. Access Tickets may be renewed within a lifetime of the Token that issued them. A Position may represent a single instance of a running process belonging to an application that wishes to access market data.

For example, a simulation system may be formed of 200 different compute nodes (e.g., calculators) and each of the compute nodes may need to access market data at a particular time or sequence. In this example, the system may have a one-time Token where the Token may be sliced into 200 tickets where each ticket may be associated with a compute node.

An embodiment of the present invention may be directed to reporting and other duties and obligations. According to an embodiment of the present invention, near real-time reporting via a message bus may be used for various functions. Functions may include offloading aggregated traffic into a data store for analysis and reporting. Data may be analyzed much closer to the point of consumption as opposed to traditional systems (e.g., Data Access Control Systems (DACS)), where hours or days can pass before logs are collected from enforcements points. Aggregated traffic may be fed into a Machine Learning algorithm which may identify hotspots and changes in access patterns. Retrospective analysis may correlate administrative operations, such as creation of Tokens and ATs to their use, flagging reuse of invalidated Tokens or sharing of ATs. Corrective action may thus be taken quicker. An embodiment of the present invention may provide for more information to be collected on how data is used, answering some of the newly emerging questions from content owners. Also, report generation may become more automated and transparent.

In addition, a custom application may implement the entire communication model, or rely on a managed Market Data service.

An embodiment of the present invention may be expanded to Reference Data. In this model, user authentication and content encryption may be implemented to provide additional opportunities for enhanced control and reduction of liabilities.

The entitlement enforcement solution of an embodiment of the present invention may be designed to be one of the building blocks of the overall Digital Rights Management solution involving computer-readable digital contracts, as well as an ecosystem of tools that uses them to automate the entire content value chain.

While traditional systems are meant to be used as a source of content entitlement knowledge in this solution, it may be easily supplemented or replaced with other ODRL-driven digital contracts store.

FIG. 1 illustrates an exemplary flow chart of a market data entitlements control, according to an embodiment of the present invention. FIG. 1 illustrates interactions between and among Client Application 102, Module to Access Market Data 104, Market Data Controls 106, Market Data Access Layer 108 and Downstream Application 110. At step 112, a client requests and receives a token. At step 114, entitlements may be checked, extracted and reported with obligations, and cryptographically signed. At step 116, the token may be used to get cryptographically signed Access Tickets (ATs). At step 118, token may be "sliced" into ATs, one for each position with a list of rights and obligations. At step 120, the token with reduced count of positions may be returned with ATs. At step 122, ATs may be passed to application modules, e.g., one per position. At step 124, modules may renew ATs before expiration, within the Tokens' lifetime, as needed. At step 126, AT may be used to retrieve market data. At step 128, obligations may be satisfied (e.g., notably, reporting). At step 130, log analysis may look for anomalies. At step 132, tokens may be renewed prior to expiration. At step 134, an application may elect to delegate part of its token to another application. At step 136, token delegation may be requested and validated. If approved, a new token may be issued for a second order application. At step 138, delegated token may be handed over to another application. At step 140, process may repeat for downstream applications. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

For example, an entity may be required to collect information about who the client is, what the client has access to, what time (or when) they access and how they plan to use the accessed data. An embodiment of the present invention may define the information as obligations, which may be part of an Access Ticket. The corresponding data may be collected in a distributed manner and then further processed and analyzed. For example, the collected data may be applied to a machine learning system to analyze the data, stored in data warehouses for historical archival as well as provided as real-time reporting to various venues.

An embodiment of the present invention may be directed to delegating an application right to another application. For example, an application may delegate part of its right to a client. In this example, a Token may be split into multiple parts where a part may be given to a client or customer so that the receiving client or customer may then access market data. The process of splitting the Token may be reportable where obligations, such as logging and reporting, may be passed to one or more receiving entities. For example, a parent application may have rights to access every exchange in North America but delegate a subset of the access rights (e.g., New York Stock Exchange) to a particular client. In addition, the parent application may delegate access to derived information to another client.

Figure 2:
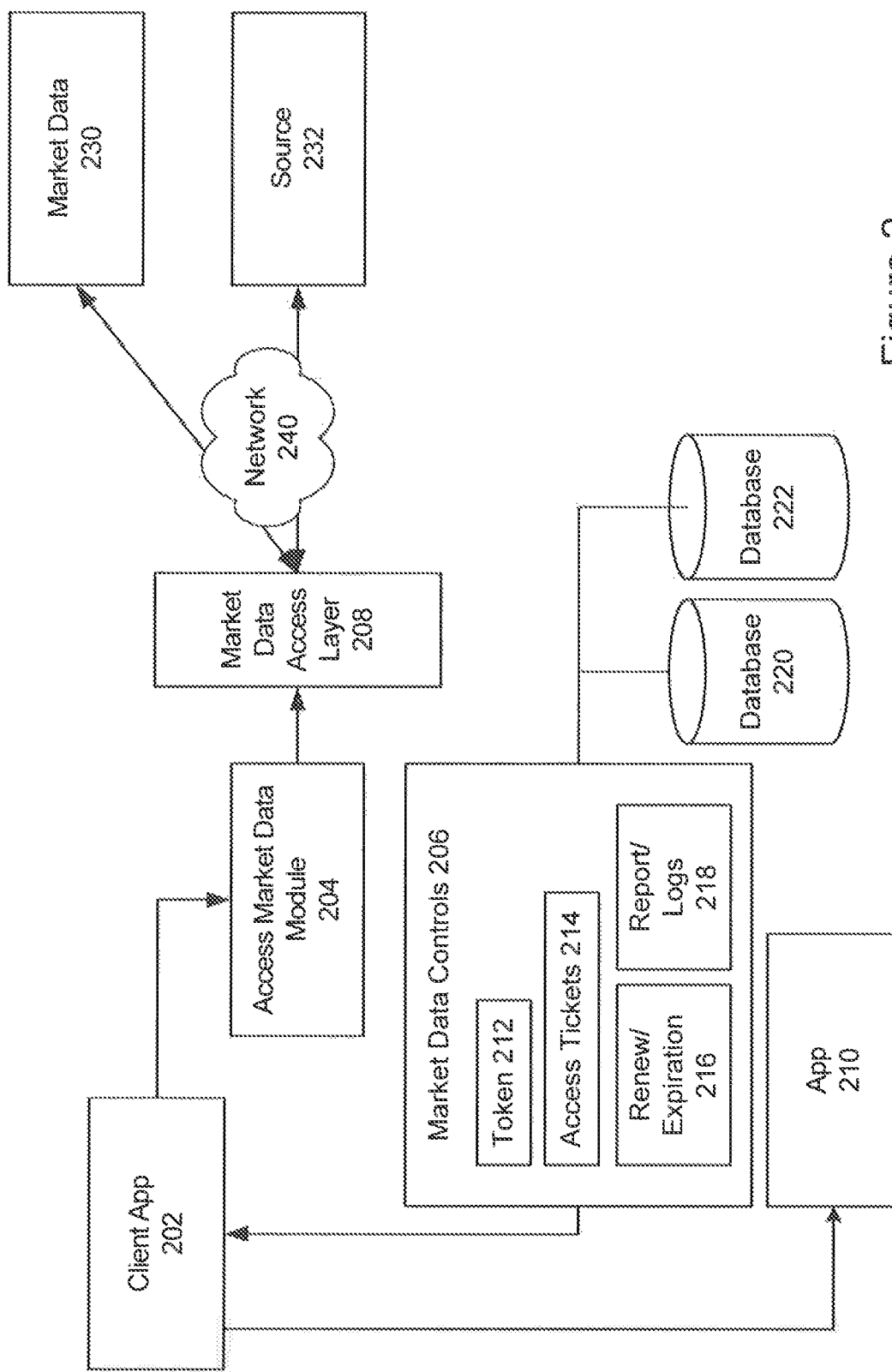
FIG. 2 illustrates a system that implements a market data entitlements infrastructure, according to an embodiment of the present invention.

FIG. 2 illustrates a system that implements a market data entitlements infrastructure, according to an embodiment of the present invention. As shown in FIG. 2, Client Application 202 may be executed on a client device or system. Client Application 202 may represent a consumer of market data. Client Application 202 may communicate with Access Market Data Module 204. Access Market Data Module 204 may access market data through Market Data Access Layer 208. Layer 208 may communicate with Market Data Sources, represented by 230, 232 via Network 240. Market Data Controls 206 may generate and transmit Tokens and Access Tickets to Client App 202. Market Data Controls 206 may provide functions relating to the generation, transmission and management of Tokens 202, Access Tickets 214. Tokens may be renewed at 216. Reporting and Log Analysis may be provided at Reporting 218 where data may be stored and managed via various storage mechanisms, represented by 220, 222. Data may be managed via cloud, local or remote storage providers. Client Application 202 may delegate entitlements to various other applications, represented by Application 210. The components illustrated in FIG. 2 are merely exemplary, other devices may be represented in various applications. While a single component is illustrated, each component may represent multiple components.

An entity, such as a financial institution, may host Client Application 202 according to an embodiment of the present invention. The entity may support market data rights entitlements features as an integrated feature or system. According to another example, market data rights entitlements services may be offered by a third party service provider. Other scenarios and architectures may be implemented. An embodiment of the present invention may send and/or receive data from various other sources represented by databases. Databases may be internal or external to a host entity. Data may be stored and managed in storage components via one or more networks. Databases may include any suitable data structure to maintain the information and allow access and retrieval of the information. The storage may be local, remote, or a combination thereof with respect to Databases. Communications with Databases may be over a network, or communications may involve a direct connection between Databases and other participants, as depicted in FIG. 2. Databases may also represent cloud or other network based storage or an application presenting a data source via an API.

A user of an embodiment of the present invention may communicate with Client Application 202 via a network through a User Interface. Communication may be performed using any mobile or computing device, such as a laptop computer, a personal digital assistant, a smartphone, a smartwatch, smart glasses, other wearables or other computing devices capable of sending or receiving network signals.

The system 200 of FIG. 2 may be implemented in a variety of ways. Architecture within system 200 may be implemented as hardware components (e.g., module) within one or more network elements. It should also be appreciated that architecture within system 200 may be implemented in computer executable software (e.g., on a tangible, non-transitory computer-readable medium) located within one or more network elements. Module functionality of architecture within system 200 may be located on a single device or distributed across a plurality of devices including one or more centralized servers and one or more mobile units or end user devices. The architecture depicted in system 200 is meant to be exemplary and non-limiting. For example, while connections and relationships between the elements of system 200 are depicted, it should be appreciated that other connections and relationships are possible. The system 200 described below may be used to implement the various methods herein, by way of example. Various elements of the system 200 may be referenced in explaining the exemplary methods described herein.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements market data entitlements controls, the system comprising:
    a memory component configured to generate, store and manage one or more tokens and one or more associated Access Tickets; and
    a computer processor, coupled to the memory component, that executes a client application, the computer processor configured to perform the steps of:
    identifying, via the client application, a token, wherein the token is a cryptographically signed description of entitlements, rights and obligations a requesting user has for one or more data sources, the token comprises a count of positions, a predetermined expiration and reference data;
    generating a set of Access Tickets based on the token, wherein each Access Ticket is associated with a position, wherein the position represents a single instance of a process that accesses market data; and
    using an Access Ticket to retrieve associated market data pursuant to a corresponding set of rights and obligations.

2. The system of claim 1, wherein the token is reduced in the count for each Access Ticket generated.

3. The system of claim 1, wherein one or more Access Tickets are renewed prior to the predetermined expiration of the token.

4. The system of claim 1, wherein the client application elects to delegate a portion of the token to one or more other applications.

5. The system of claim 4, wherein a new token is generated for the delegated portion.

6. The system of claim 1, wherein the market data is accessed from one or more external sources via a market data access layer.

7. The system of claim 1, wherein the computer processor is further configured to perform the step of:

reporting access history based on the Access Tickets.

8. The system of claim 1, wherein the computer processor is further configured to perform the step of:

offloading aggregated traffic into one or more data stores for analysis and reporting.

9. The system of claim 1, wherein the computer processor is further configured to perform the step of:

feeding aggregated traffic to a machine learning algorithm to identify one or more hotspots and changes in access patterns.

10. The system of claim 1, wherein the computer processor is further configured to perform the step of:

applying retrospective analysis to correlate administrative operations.

11. A method that implements market data entitlements controls, the method comprising the steps of:

identifying, via a client application, a token, wherein the token is a cryptographically signed description of entitlements, rights and obligations a requesting user has for one or more data sources, the token comprises a count of positions, a predetermined expiration and reference data;

generating a set of Access Tickets based on the token, wherein each Access Ticket is associated with a position, wherein the position represents a single instance of a process that accesses market data; and using an Access Ticket to retrieve associated market data pursuant to a corresponding set of rights and obligations.

12. The method of claim 11, wherein the token is reduced in the count for each Access Ticket generated.

13. The method of claim 11, wherein one or more Access Tickets are renewed prior to the predetermined expiration of the token.

14. The method of claim 11, wherein the client application elects to delegate a portion of the token to one or more other applications.

15. The method of claim 14, wherein a new token is generated for the delegated portion.

16. The method of claim 11, wherein the market data is accessed from one or more external sources via a market data access layer.

17. The method of claim 11, further comprising the step of:

reporting access history based on the Access Tickets.

18. The method of claim 11, further comprising the step of:

offloading aggregated traffic into one or more data stores for analysis and reporting.

19. The method of claim 11, further comprising the step of:

feeding aggregated traffic to a machine learning algorithm to identify one or more hotspots and changes in access patterns.

20. The method of claim 11, further comprising the step of:

applying retrospective analysis to correlate administrative operations.

* * * * *